United States Patent
No et al.

(10) Patent No.: US 10,079,077 B2
(45) Date of Patent: Sep. 18, 2018

(54) WATER-COOLED REACTOR SYSTEM FOR GENERATING ELECTRICITY

(71) Applicant: KOREA ADVANCED INSTITUTE OF SCIENCE AND TECHNOLOGY, Daejeon (KR)

(72) Inventors: Hee Cheon No, Daejeon (KR); Ho Sik Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 836 days.

(21) Appl. No.: 14/633,811

(22) Filed: Feb. 27, 2015

(65) Prior Publication Data

US 2015/0243386 A1 Aug. 27, 2015

Related U.S. Application Data

(63) Continuation-in-part of application No. PCT/KR2012/010628, filed on Dec. 7, 2012.

(30) Foreign Application Priority Data

Aug. 29, 2012 (KR) .................. 10-2012-0095031

(51) Int. Cl.
*G21C 15/24* (2006.01)
*G21C 15/18* (2006.01)
(Continued)

(52) U.S. Cl.
CPC .............. *G21C 15/24* (2013.01); *G21C 15/18* (2013.01); *G21C 19/07* (2013.01); *G21C 15/14* (2013.01); *Y02E 30/40* (2013.01)

(58) Field of Classification Search
CPC ........ G21C 15/18; G21C 15/24; G21C 15/14; G21C 19/07
(Continued)

(56) References Cited

U.S. PATENT DOCUMENTS 3,165,446 A * 1/1965 Untermyer ............ G21C 17/10
376/254
3,923,596 A * 12/1975 Leonard ................. G21C 3/36
376/432
(Continued)

FOREIGN PATENT DOCUMENTS

FR 2686444 A1 * 7/1993 .............. G21C 9/02
JP 07181279 A 7/1995
(Continued)

OTHER PUBLICATIONS

Kim, "Design verification program of SMART", Technology, Sep 2003. (Year: 2003).*
(Continued)

*Primary Examiner* — Jack W Keith
*Assistant Examiner* — Daniel Wasil
(74) *Attorney, Agent, or Firm* — Fredrikson & Byron, P.A.

(57) ABSTRACT

A nuclear reactor system for generating electricity includes a nuclear reactor that uses water as a coolant and a moderator, and generates thermal energy through nuclear fission. The reactor includes a reactor vessel and a reactor core. The reactor core comprises a plurality of fuel assemblies and one or more core baffles. In an embodiment the reactor core is square-shaped with a hollow center portion, and is concentric with the reactor vessel. The reactor permits decay-heat removal from the fuel assemblies in the absence of the coolant. A power conversion system is arranged to indirectly receive thermal energy generated by the reactor core and to generate electricity. A refueling water storage tank is useable when the reactor core is refueled with nuclear fuel. A containment surrounds the reactor vessel and the refueling water storage tank.

15 Claims, 3 Drawing Sheets

(51) Int. Cl.
*G21C 19/07* (2006.01)
*G21C 15/14* (2006.01)

(58) Field of Classification Search
USPC .................. 376/264, 282, 298, 299
See application file for complete search history.

(56) References Cited

U.S. PATENT DOCUMENTS

| | | | | |
|---|---|---|---|---|
| 5,259,008 | A | 11/1993 | Schulz | |
| 6,470,062 | B1* | 10/2002 | Nylund | G21C 3/322 |
| | | | | 376/370 |
| 8,529,713 | B2* | 9/2013 | Ahlfeld | G21C 19/00 |
| | | | | 376/260 |
| 8,867,690 | B2* | 10/2014 | Watson | G21C 15/18 |
| | | | | 376/298 |
| 2003/0077202 | A1 | 4/2003 | Furkasov et al. | |
| 2006/0039524 | A1 | 2/2006 | Feinroth et al. | |
| 2007/0092053 | A1* | 4/2007 | Sato | G21C 9/004 |
| | | | | 376/283 |
| 2009/0323884 | A1* | 12/2009 | Sato | G21C 15/18 |
| | | | | 376/283 |
| 2011/0096890 | A1* | 4/2011 | Balog | G21C 11/06 |
| | | | | 376/458 |
| 2015/0170766 | A1* | 6/2015 | Singh | G21C 19/18 |
| | | | | 376/426 |

FOREIGN PATENT DOCUMENTS

| | | |
|---|---|---|
| JP | 2000338278 A | 12/2000 |
| JP | 2004077127 A | 3/2004 |
| KR | 1020010063656 A | 7/2001 |
| KR | 100813939 B1 | 3/2008 |
| KR | 100877757 B1 | 1/2009 |
| KR | 1020090047186 A | 5/2009 |
| KR | 101089103 B | 12/2011 |

OTHER PUBLICATIONS

PCT International Search Report for Intl. App. No. PCT/KR2012/010628, from which the instant application is based, 2 pgs.

* cited by examiner

WATER-COOLED REACTOR SYSTEM FOR GENERATING ELECTRICITY

CROSS-REFERENCE TO RELATED APPLICATIONS

This patent application is a continuation-in-part of and claims the benefit of priority from International PCT Application No. PCT/KR2012/010628 filed 12 Jul. 2012, which claims priority to Korean Patent Application No. 10-2012-0095031 filed on Aug. 29, 2012, the contents of which are incorporated herein by reference.

BACKGROUND OF THE INVENTION

1. Field of the Invention

The present invention relates to a reactor system for generating electricity, more precisely a public acceptable simple water-cooled reactor system for generating electricity.

2. Description of the Related Art

Because of the nuclear accident that happened in Fukushima, Japan, in Mar. 11, 2011, the public deeply suspects the safety of nuclear power plant and accordingly efforts have been made to increase safety of the conventional nuclear power plant. Most of the nuclear reactors in the world including the reactor of Japan that had accident are water-cooled reactors. The water-cooled reactor uses water as a coolant in the reactor core, which is exemplified by pressurized water reactor, pressurized heavy water reactor, and boiling water reactor, etc. The important task to increase safety of such water-cooled reactor is to remove decay heat that is constantly generated by radioactive decay of a fission product after the reactor is stopped. To prepare the situation, an emergency core cooling system is equipped in the water-cooled reactor.

Korean Patent No. 10-0668048 describes the system for cooling the exterior wall of a reactor vessel and the method thereof. According to the document, the system contains at least one of pumps to circulate cooling water.

That is, like the system described in the prior art, a safety system so far has depended on the active component that is run by electric power. So, if electric power is lost, all the safety system including such an active component is useless, which has been witnessed in Japan nuclear disaster. Since then, studies have been actively undergoing on the safety system that can remove decay heat generated in the reactor with passive system based on gravity or natural circulation without using an active component. However, the passive safety system is not a perfect alternative to solve the problem of the recent water-cooled reactor. If electric power is lost and natural disasters such as earthquake attack and thus safety system cannot be used, core meltdown and the exposure to the radioactive material are inevitable. Besides, the addition of a safety system increases the reactor construction costs.

Therefore, it is required to develop a novel public acceptable simple water-cooled reactor that includes an efficient decay heat removal system without any additional equipment of safety system.

In the course of study to develop a public acceptable simple water-cooled reactor that includes a decay heat removal system without any additional safety system, the present inventors established a public acceptable simple water-cooled reactor which is not equipped with an additional safety system or any separate cooling water supply but is able to remove decay heat generated right after the nuclear reactor is stopped only using water in the reactor, when a coolant or electric power is lost by an accident, leading to the completion of this invention.

SUMMARY OF THE INVENTION

It is an object of the present invention to provide a public acceptable simple water-cooled reactor system for generating electricity.

To achieve the above object, the present invention provides a public acceptable simple water-cooled reactor system for generating electricity, which includes:

a water-cooled reactor that uses water as a coolant and a moderator and generates thermal energy through nuclear fission;

a power conversion system that is connected to the water-cooled reactor so as to indirectly receive the thermal energy generated by the reactor core of the water-cooled reactor via a heat exchanger in a containment and generates electricity;

a in-containment refueling water storage tank (IRWST) that is used when the water-cooled reactor is refueled with a nuclear fuel; and a containment that surrounds the entire reactor system including the water-cooled reactor and the in-containment refueling water storage tank.

The present invention also provides a public acceptable simple water-cooled reactor system for generating electricity, which includes:

a water-cooled reactor that uses water as a coolant and a moderator and generates thermal energy through nuclear fission;

a power conversion system that is connected to the water-cooled reactor so as to directly receive the thermal energy generated by the reactor core of the water-cooled reactor without a heat exchanger and generates electricity;

a in-containment refueling water storage tank that is used when the water-cooled reactor is refueled with a nuclear fuel; and a containment that surrounds the entire reactor system including the water-cooled reactor and the in-containment refueling water storage tank.

ADVANTAGEOUS EFFECT

The public acceptable simple water-cooled reactor system for generating electricity of the present invention can be used as a safe energy source since unlike the conventional water-cooled reactor this reactor has inherent and passive safety features, suggesting that safety related suspicion is overcome.

In addition, the system of the invention facilitates the production of electricity more economically than the conventional system with reducing production costs because the system of the invention does not need various or separate safety systems required for the conventional water-cooled reactors owing to the inherent and passive safety features.

Further, the reactor system of the present invention can be also effectively applied to other processes, in addition to the generation of electricity, as long as they are in the limit of the scope of the invention.

BRIEF DESCRIPTION OF THE DRAWINGS

The application of the preferred embodiments of the present invention is best understood with reference to the accompanying drawings, wherein.

BRIEF DESCRIPTION OF THE MARK OF DRAWINGS

Figure 1:
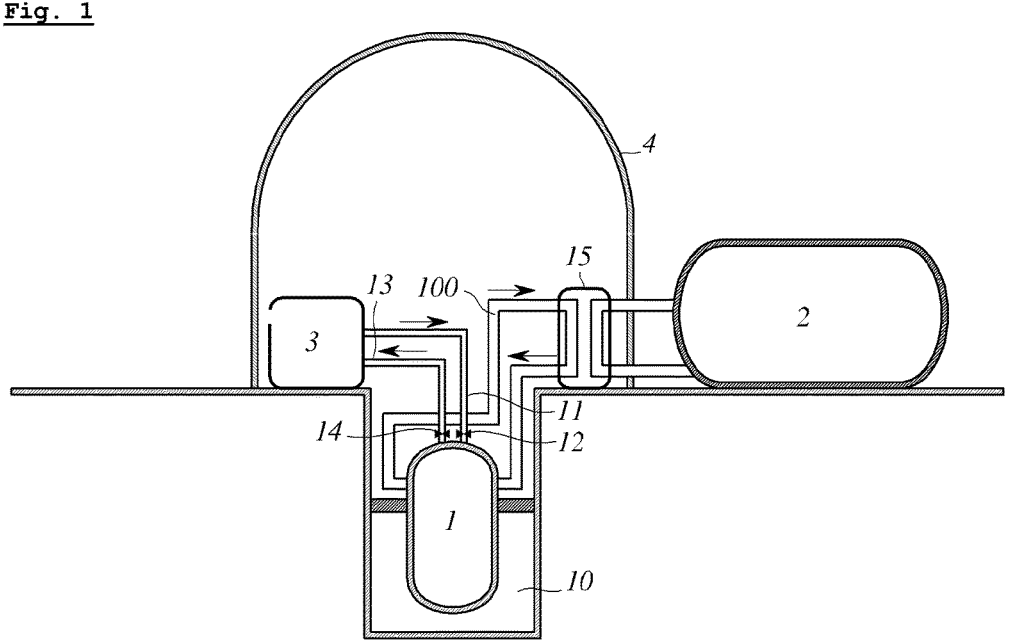
FIG. 1 and FIG. 2 are schematic diagrams illustrating the public acceptable simple water-cooled reactor system of the present invention.

1: water-cooled reactor
2: power conversion system
3: in-containment refueling water storage tank
4: containment
5, 6: core baffle
7: nuclear fuel assemblies
8: core support barrel
9: reactor vessel
10: reactor cavity
11: core cooling water supply line of in-containment refueling water storage tank
12: core cooling water supply valve of in-containment refueling water storage tank
13: reactor pressure reducing line
14: reactor pressure reducing valve
15: heat exchanger
100: water

DESCRIPTION OF THE PREFERRED EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical spirit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

Hereinafter, the embodiments of the present invention will be described with reference to the accompanying drawings.

Figure 2:
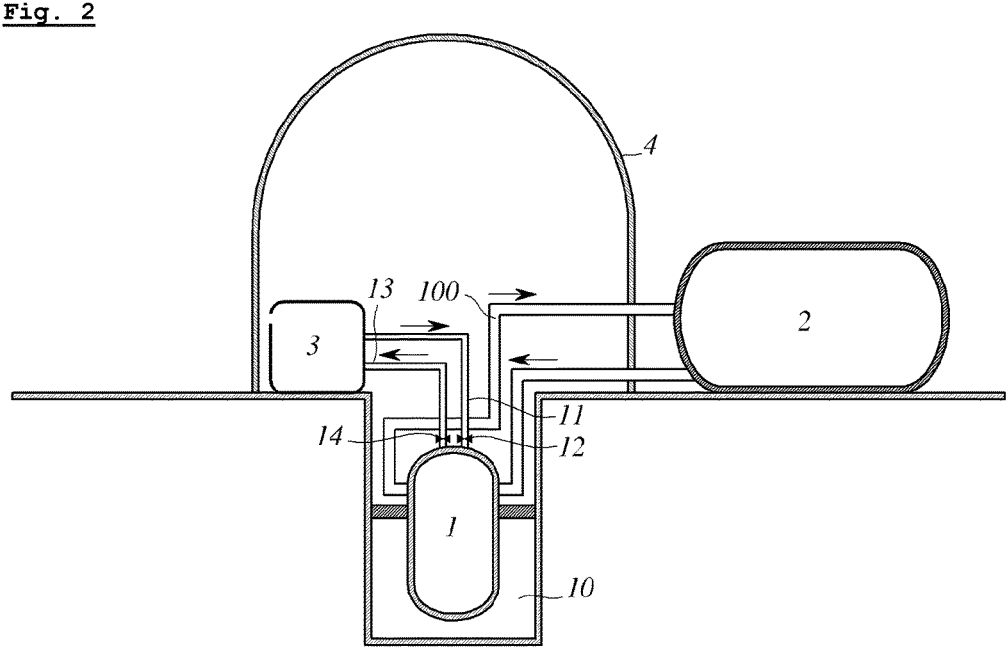
Figure 3:
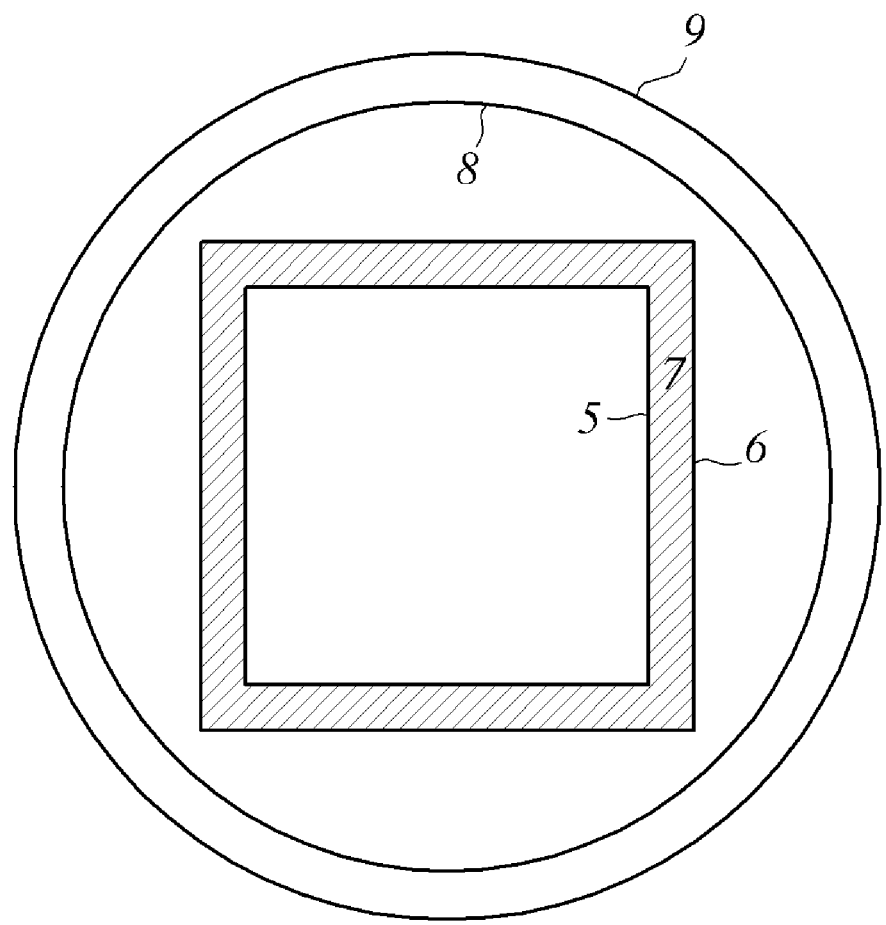
FIG. 3 is a schematic diagram illustrating the section of the water-cooled reactor, in which the nuclear fuel assemblies are arranged in the square ring, according to a preferred embodiment of the present invention.

FIGS. 1, 2, and 3 are schematic diagrams illustrating the public acceptable simple water-cooled reactor system for generating electricity according to the preferred embodiments of the present invention.

As shown in FIG. 1, the public acceptable simple water-cooled reactor system for generating electricity of the present invention is composed of:

a water-cooled reactor (1) that uses water (100) as a coolant and a moderator and generates thermal energy through nuclear fission;

a power conversion system (2) that is connected to the water-cooled reactor (1) so as to indirectly receive the thermal energy generated by the reactor core of the water-cooled reactor via a heat exchanger (15) in a containment (4) and generates electricity;

a in-containment refueling water storage tank (3) that is used when the water-cooled reactor (1) is refueled with a nuclear fuel; and a containment (4) that surrounds the entire reactor system including the water-cooled reactor (1) and the in-containment refueling water storage tank (3).

As shown in FIG. 2, the public acceptable simple water-cooled reactor system for generating electricity of the present invention can be composed of:

a water-cooled reactor (1) that uses water (100) as a coolant and a moderator and generates thermal energy through nuclear fission;

a power conversion system (2) that is connected to the water-cooled reactor (1) so as to directly receive the thermal energy generated by the reactor core of the water-cooled reactor without a heat exchanger and generates electricity;

a in-containment refueling water storage tank (3) that is used when the water-cooled reactor (1) is refueled with a nuclear fuel; and a containment (4) that surrounds the entire reactor system including the water-cooled reactor (1) and the in-containment refueling water storage tank (3).

At this time, the said water (100) used as a coolant and a moderator in the water-cooled reactor (1) can be heavy water or light water.

The public acceptable simple water-cooled reactor system of the present invention is to generate electricity, in which the water-cooled reactor (1) is the one that can be run at hundreds of degree and under the high pressure of some MPa. So, it is preferred for the water-cooled reactor to be operable under the pressure of 1~30 MPa and with the exit temperature of 200~700° C.

The water-cooled reactor (1) above can be applied to the boiling water reactor that allows the boiling of a coolant according to the acceptable pressure and temperature, the pressurized water reactor that does not allow the boiling of a coolant, or the supercritical water reactor that uses supercritical water.

Further, the water-cooled reactor (1) can also be applied to a pool type reactor that is allowed to contain a huge amount of water. This pool type reactor is a preparation for the removal of decay heat generated at a high level right after the reactor is stopped by using a huge amount of water in the pool without any additional safety system or any additional cooling water supply, when a coolant or electric power is lost by accidents.

As shown in FIG. 3, the water-cooled reactor (1) includes the reactor core with square ring-type arrangement of the nuclear fuel assemblies (7). This is because when an accident happens so that all the water in the reactor is evaporated, the decay heat constantly generated in the fuel rods of the nuclear fuel assemblies (7), even though it is at a low level, has to be removed out of the reactor via radiation heat transfer without cooling water. The reactor core with square ring-type arrangement of the nuclear fuel assemblies is very much different from the conventional water-cooled reactor. In the reactor core of the conventional water-cooled nuclear reactor, the nuclear fuel assemblies are densely arranged in the circle. However, when all the water is dried up in the reactor, the temperature in the core center area rises high with such a circular arrangement of the nuclear fuel assemblies. So, it is necessary to remove decay heat through a safety injection system. The reactor core with square ring-type arrangement of the nuclear fuel assemblies (7) facilitates decay heat removal via radiation heat transfer without any additional safety system.

In the water-cooled nuclear reactor (1), the components that have to endure a high temperature in the reactor caused by decay heat removal such as fuel rod cladding, control rod cladding, control rod guide tube, and core baffle (5, 6) were substituted with ceramic materials such as silicon carbide (SiC) or zirconium carbide (ZrC). This is because when all the water in the reactor is dried up by an accident, the decay heat constantly generated at a low level in the fuel rods of the nuclear fuel assemblies (7) has to be removed out of the reactor via radiation heat transfer without cooling water. Particularly, the conventional metal cladding was substituted with ceramic material such as silicon carbide or zirconium carbide, by which the critical heat flux is allowed even under the worst transient operation situation. Further, this substitution can prevent the risk of hydrogen explosion that has been the worry of the conventional water-cooled reactor when the metal cladding reacts with water at a high temperature to generate hydrogen gas.

The water-cooled reactor (1) of the present invention is located in the underground. By locating the water-cooled reactor in the underground, the concrete wall surrounding the steel containment can be removed, when the steel containment is used. The concrete wall is the structure to protect the reactor system from the external shock, but when the reactor sits in the underground, such concrete wall is not necessary. But, this invention is not limited thereto and the concrete wall surrounding the steel containment can also be included.

The water-cooled reactor (1) can be located beneath the surface of the earth, and therefore the reactor cavity (10) is naturally included. The reactor cavity (10) is to emit the core decay heat. In the occasion of an accident such as station blackout or loss of coolant, the outside cooling of the reactor vessel (9) can be achieved by filling the reactor cavity (10) with water, resulting in the efficient cooling of the reactor. Even when an accident of breaking the reactor vessel happens and coolant is lost, the rapid increase of decay heat caused by the loss of coolant in the rector can be prevented by filling the reactor cavity with water so as not to expose the core in the air.

When an accident happens and the coolant line of the reactor is broken or coolant is lost, the released coolant gathered naturally by gravity in the reactor cavity (10) and also cooling water can be actively supplied to the reactor cavity (10) via pump and valve run by AC power from the in-containment refueling water storage tank (3). In addition, in the case of station blackout accident, the cooling water can be passively delivered to the reactor cavity (10) via gravity and valve run by DC power such as a battery from the in-containment refueling water storage tank (3), by which decay heat in the rector can be efficiently cooled down without any additional cooling system.

In a loss of coolant accident such as coolant piping break, vapor is generated during the evaporation of the coolant in the reactor. At this time, the generated vapor comes out of the reactor and condensed in the containment and then gathered passively in the reactor cavity (10) by gravity to play a role as a cooling water.

The water-cooled reactor (1) is the nuclear reactor that uses water (100) as a coolant. To circulate water, the coolant, it can use a reactor coolant pump (RCP) requiring AC power or natural circulation methodonly using the density difference of a coolant without using any active component.

The containment is made of concrete or steel. However, the containment made of steel is preferred because the steel containment is more effective in removing decay heat via conductive, radiative, and convective heat transfer. At this time, the steel containment can include a fin structure. By having the fin structure, the steel containment facilitates the decay heat removal more efficiently because of the increased heat transfer area. However, the structure of the containment (4) is not limited thereto, and any conventional steel containment that does not include the fin structure can be used in addition to the steel containment having the fin structure.

The containment (4) can be equipped with an heat exchanger in order to let the vapor generated in the reactor (1) be condensed in the heat exchanger in a loss of coolant accident. At this time, the decay heat can be removed through the heat exchanger even when the containment is made of concrete.

The in-containment refueling water storage tank (3) can be used as the cooling water source for cooling the reactor core when an accident such as loss of coolant accident and station blackout accident happens.

Water in the in-containment refueling water storage tank (3) is provided as a cooling water for the rector cooldown through the cooling water supply valve (12) equipped in the core cooling water supply line (11). As the cooling water supply valve herein, the valve run by AC power or the valve run by DC power such as battery can be used in order to prepare station blackout accident.

In a loss of coolant accident such as coolant piping break, the cooling water in the reactor is evaporated with removing decay heat out of the reactor. The emitted vapor is condensed in the containment and flow down. The reactor system of the present invention can contain a flow path to gather the falling condensed water in the in-containment refueling water storage tank (3). The condensed water gathered in the in-containment refueling water storage tank through the flow path can be used as a cooling water, by which cooling water can be constantly provided from the in-containment refueling water storage tank.

In the event of station blackout accident without loss of coolant, even when vapor is generated by coolant evaporation in the reactor (1) by decay heat, the generated vapor is not escaping out of the reactor system, because the accident is not related to coolant loss, so that the pressure in the reactor (1) rises, which might result in the decrease of decay heat removal efficiency. If the pressure in the reactor keeps going up, a coolant piping break accident can follow because of the unbearable pressure in the reactor system, resulting in the loss of coolant.

Therefore, the reactor (1) pressure control system is required for the preparation of station blackout accident. In the reactor system of the present invention, the in-containment refueling water storage tank (3) and the water-cooled reactor (1) are connected to the reactor pressure reducing line (13) so as to send the vapor generated in the reactor into the in-containment refueling water storage tank (3) to condense the vapor there, by which the pressure in the reactor can be easily controlled.

The said reactor pressure reducing line (13) is equipped with the reactor pressure reducing valve (14). To remove the vapor generated constantly by decay heat, the reactor pressure reducing valve (14) has to be opened. In the reactor system of the present invention, when the reactor pressure reaches a set point, the reactor pressure reducing valve (14) is opened by AC power or DC power like battery or passively forced to be opened by the inner pressure. Once the valve is opened, it stays opened even when the pressure goes down under the set point. That is, even when the vapor is constantly generated by decay heat, the vapor can be emitted and condensed in the in-containment refueling water storage tank (3).

Further, by reducing the pressure of the water-cooled reactor (1) via the pressure reducing line (13) and the pressure reducing valve (14), cooling water can be passively provided to the reactor simply via gravity without using a pump, in the situation of an accident such as station blackout accident.

To increase the efficiency of cooling water supply, water in the in-containment refueling water storage tank (3) is supplied through a pump in the blackout accident free situation, indicating that the smooth supply of water of the in-containment refueling water storage tank (3) increases the cooling efficiency of the reactor.

In the event of station blackout accident without loss of coolant, the vapor generated in the reactor during decay heat removal is emitted to the in-containment refueling water storage tank (3) through the pressure reducing line (13) and the pressure reducing valve (14) and condensed therein. At this time, when the cooling water supply valve (12) to supply cooling water into the inside of the reactor and the valve to deliver cooling water into the reactor cavity (10) are not operated by DC power such as battery, the travel of cooling water through the valves is not possible. So, the in-containment refueling water storage tank (3) of the present invention is designed to have an opening on the upper part of the side, by which water is spilled from the in-containment refueling water storage tank and gathered passively in the reactor cavity when the in-containment refueling water storage tank (3) is full of water.

As shown in FIG. 1 and FIG. 2, the power conversion system (2) can receive thermal energy generated in the water-cooled nuclear reactor core either indirectly through the heat exchanger (15) in the containment or directly therefrom without the heat exchanger.

The novel public acceptable simple water-cooled reactor system of the present invention makes it possible to remove decay heat all and safely only with the equipped reactor system components themselves as running in the normal operation situation without any separate safety system in the situation of an accident like station blackout or loss of coolant. Particularly, in the situation when cooling water is not supplied from the in-containment refueling water storage tank (3) and the reactor pressure reducing valve (14) is not working, not only high level decay heat but also low level decay heat generated after the water in the reactor is all evaporated can be safely removed under the standard limit of the rector temperature and the pressure in the containment by the water-coolant reactor of the present invention designed to do so.

According to the public acceptable simple water-cooled reactor system for generating electricity, the in-containment refueling water storage tank (3) can be used as a coolant supply tank to remove decay heat in an accident. At this time, cooling water is passively provided to the reactor core or the reactor cavity from the in-containment refueling water storage tank (3), so that cooling water is safely provided even in the station blackout accident or in an accident situation accompanying station blackout, suggesting that decay heat removal is more efficient, compared with when cooling water supply is stopped.

Further, the public acceptable simple water-cooled reactor system for generating electricity of the present invention has inherent and passive safety features, so that many safety systems required for the conventional nuclear reactor are not necessary and accordingly the production cost becomes low, indicating the more economic electricity generation is possible with the system of the invention.

In the meantime, the public acceptable simple water-cooled reactor system for generating electricity of the present invention is appropriate for the electricity generation, but also can be applied to other processes including seawater desalination, district heating, petroleum refining, hydrogen production, other industrial heating or reaction process, etc, as long as the temperature range of such processes are within the limit of allowed temperature for the reactor system of the invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water-cooled reactor system for generating electricity, which includes:
    a water-cooled nuclear reactor that uses water as a coolant and a moderator and generates thermal energy through nuclear fission, the reactor including a reactor vessel, and a reactor core, the reactor core comprising a plurality of nuclear fuel assemblies, and one or more core baffles,
    the reactor core being of a shape having a hollow center portion and concentric with the reactor vessel so as to permit decay-heat removal from the plurality of nuclear fuel assemblies in the absence of the coolant;
    a power conversion system that is connected to the water-cooled nuclear reactor so as to indirectly receive the thermal energy generated by the reactor core of the water-cooled nuclear reactor via a heat exchanger or directly receive the thermal energy without passing through the heat exchanger, and generates electricity;
    a refueling water storage tank that is used when the water-cooled reactor is refueled with a nuclear fuel; and
    a containment that surrounds the water-cooled reactor, and the refueling water storage tank.

2. The water-cooled reactor system according to claim 1, wherein the water-cooled reactor is operated under the pressure of 1-30 MPa and has the exit temperature of 200-700° C.

3. The water-cooled reactor system according to claim 1, wherein the water-cooled nuclear reactor includes fuel rod cladding, control rod cladding, and control rod guide tube, wherein, at least one of the fuel rod cladding, control rod cladding, control rod guide tube and the core baffle is made of silicon carbide or zirconium carbide.

4. The water-cooled reactor system according to claim 1, wherein the water-cooled nuclear reactor is located in the underground.

5. The water-cooled reactor system according to claim 1, wherein the water-cooled nuclear reactor is equipped with a reactor cavity.

6. The water-cooled reactor system according to claim 5, wherein the reactor cavity is supplied with water from the refueling water storage tank actively by a pump and an AC powered valve or passively by gravity and a DC powered supply valve.

7. The water-cooled reactor system according to claim 1, wherein the refueling water storage tank is connected to the water-cooled reactor via a reactor pressure reducing line equipped with a pressure reducing valve.

8. The water-cooled reactor system according to claim 7, wherein the pressure reducing valve is opened by AC power or DC power when the pressure of the reactor reaches a set point or passively pushed open by an inner pressure and once the pressure reducing valve is opened, the pressure reducing valve is not closed again even when the pressure of the reactor drops down under the set point.

9. The water-cooled reactor system according to claim 1, wherein the refueling water storage tank supplies cooling water to the reactor through a cooling water supply line equipped with a supply valve in order to cool the reactor core.

10. The water-cooled reactor system according to claim 9, wherein the reactor core is supplied with water from the refueling water storage tank actively by a pump and an AC powered supply valve or passively by gravity and a DC powered supply valve.

11. The water-cooled reactor system according to claim 1, wherein the reactor system includes a flow path to gather water which is condensed at an inner surface of the containment into the refueling water storage tank.

12. The water-cooled reactor system according to claim 1, further comprising a reactor coolant pump (RCP) powered by AC power to circulate the coolant.

13. The water-cooled reactor system according to claim 1, wherein the refueling water storage tank comprises an opening on its side wall.

14. The water-cooled reactor system according to claim 1, wherein the containment is made of steel.

15. The water-cooled reactor system of claim 1, wherein the reactor core is square-shaped, wherein the hollow center portion is a square-shaped hollow.

* * * * *